United States Patent Office 3,332,824
Patented July 25, 1967

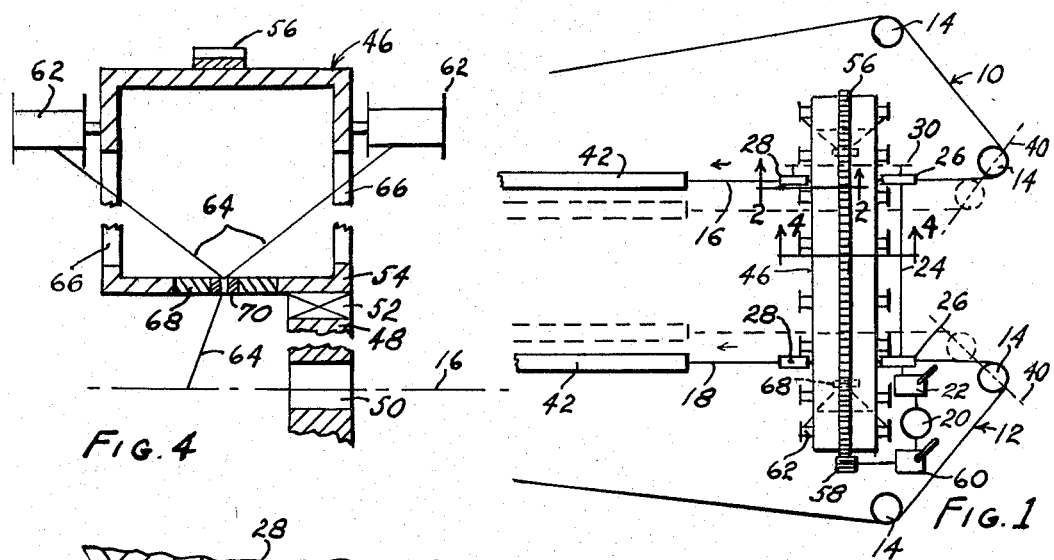
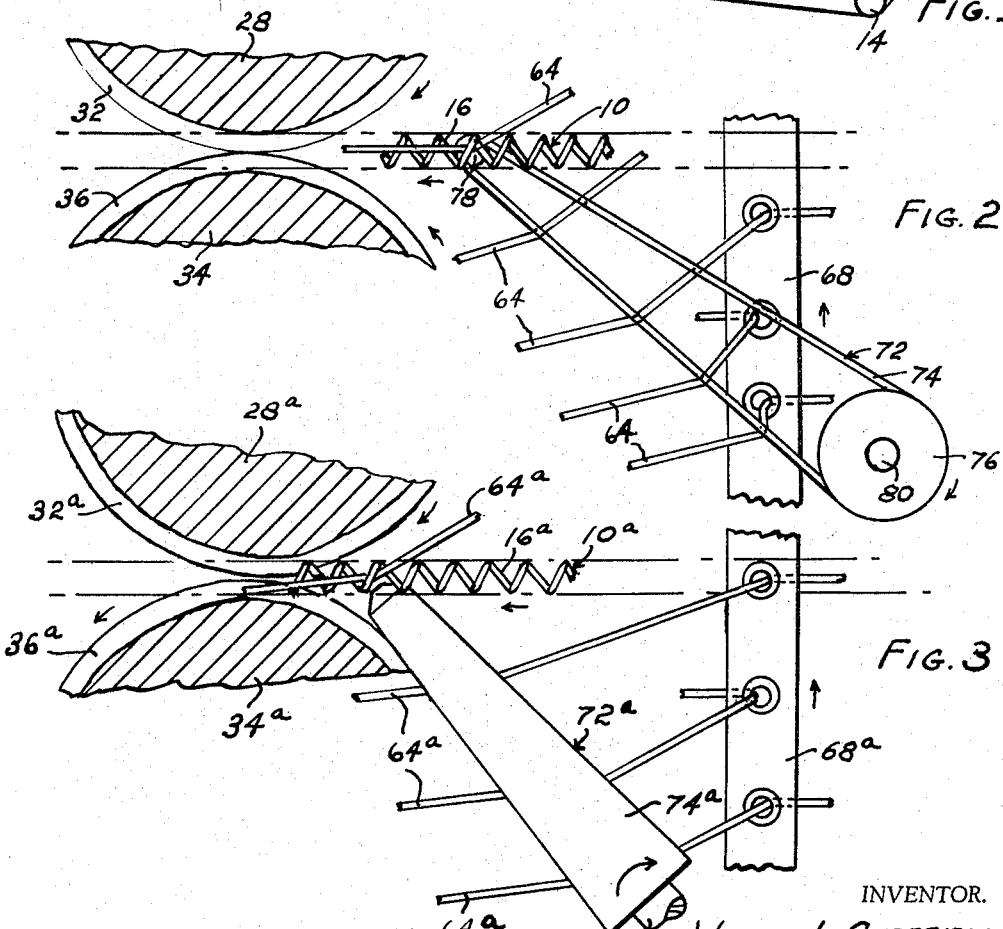

3,332,824
APPARATUS FOR PLACING STRAND ON ENDLESS CARRIERS IN THE MANUFACTURE OF STRAND REINFORCED PLASTIC WEBS
Wilbur L. Sheffield, Boston, Mass., assignor, by mesne assignments, to Stauffer Chemical Company, New York, N.Y., a corporation of Delaware
Filed Oct. 11, 1965, Ser. No. 494,568
5 Claims. (Cl. 156—430)

ABSTRACT OF THE DISCLOSURE

A pair of endless carriers having spaced parallel reaches are provided and a hoop-like wheel surrounds the reaches with strand-carrying spools being provided on the wheel for depositing strands on the reaches upon relative movement of the wheel and reaches. Special guide means are provided to aid in depositing the strands from the individual spools onto the parallel reaches on the endless carriers. Special bearing and drive means are provided for supporting the wheel.

---

This invention relates to apparatus for making strand-reinforced plastic webs, and, more particularly, is concerned with improved mechanism for placing and positioning flexible strands such as glass fibers or nylon on endless carriers which are continuously moving and so that the strands form a flat helix on the carriers.

The present invention is concerned with an improvement upon apparatus of the type shown in U.S. Patent No. 3,169,087.

The general object of the invention is the provision of apparatus for making flexible plastic webs reinforced with flexible strands extending diagonally of the web and laterally spaced in relation to each other and wherein the apparatus is less expensive to build, maintain, and operate, and is more efficient.

Another object of the invention is to provide in apparatus of the character described improved mechanism for assisting in transferring to parallel reaches of endless carriers the flexible strands from spools carried on a rotating wheel surrounding the parallel reaches.

Another object of the invention is to provide apparatus of the type described wherein the lateral spacing between the parallel reaches of the endless carriers can be changed to provide for the manufacture of reinforced plastic webs of a selected width.

Another object of the invention is the provision of apparatus such as described wherein the spool carrying wheel is provided with internal bearings and with a rim drive, and wherein means are incorporated for adjustably varying the rotary speed of the spool carrying wheel in relation to the forward speed of the parallel reaches of the endless carriers.

The foregoing objects of the invention, and other objects which will become apparent as the description proceeds, are achieved by the provision of apparatus for making strand reinforced webs including a pair of endless carriers having spaced parallel reaches, means for advancing the reaches, a hoop-like wheel surrounding the reaches, a plurality of strand-carrying spools on the wheel, a guide ring carried with and in inside concentric relation with the wheel, a plurality of circumferentially-spaced eyes on the guide ring each eye guiding a strand, adjustable speed means to rotate the wheel from its outer rim and in adjustable speed relation with the means for advancing the reaches to wrap the strands in a flat helix around the parallel reaches of the carriers as these are advanced, a rotary means positioned between the guide ring and each parallel reach of a carrier to guide each strand from its eye and to deposit each strand on said parallel reaches during the operation of the apparatus, and means for rotating said rotary means.

For a better understanding of the invention reference should be had to the accompanying drawings wherein:

FIGURE 1 is a plan view, partially broken away, of one best known embodiment of the invention;

FIGURE 2 is an enlarged fragmentary cross sectional view taken approximately on line 2—2 of FIGURE 1;

FIGURE 3 is a view similar to FIGURE 2 but showing a modified form of the invention; and FIGURE 4 is an enlarged, fragmentary cross sectional view through the spool-carrying wheel taken substantially on line 4—4 of FIGURE 1.

In the drawings, the numerals 10 and 12 indicate a pair of endless carriers appropriately mounted upon rotatable means 14 so as to provide a pair of parallel reaches 16 and 18 which are adapted to be driven at a controllable speed in the direction of the arrows.

The endless carriers 10 and 12 are preferably in the form of metal springs of helically wound wire, the parallel reach 16 of endless carrier 10 being better seen in FIGURE 2.

The apparatus for driving the parallel reaches 16 and 18 in the direction of the arrows at a controllable speed may take a variety of forms, but as illustrated in the drawings includes an electric motor 20 operating through an adjustable speed gear box 22 to drive a shaft 24 having driving wheels 26 splined to the shaft. A second set of spline-mounted driving wheels 28 may likewise be provided to engage the parallel reaches 16 and 18 somewhat downstream, chain drives 30 connecting the wheels 28 with the shaft 24. FIGURE 2 shows drive wheel 28 having a half round periphery 32 engaging in driving relation with the parallel reach 16 of the endless carrier 10. A similar wheel 34 having a half round groove 36 engages with the other side of the parallel reach 16 in association with both the driving wheel 28 and the driving wheel 26, and with wheel 34 normally constituting an idler, but being driven if desired.

The lateral spacing between the driving wheels 26, 28 and 34 for the parallel reaches 16 and 18 of the endless carriers 10 and 12 can be made adjustable, as well as the lateral position of certain of the rotary supporting means 14 for the endless carriers. In this manner the parallel reaches 16 and 18 can be moved from the full line position shown in FIGURE 1 to the dotted line position shown so as to provide for the manufacture of strand reinforced plastic webs of a selected width. To this end, rotary supporting means 14 can be made adjustable along a track indicated diagrammatically at 40, and driving wheels 26, 28 and 34 can be adjusted along their splines and repositioned by set screws (not shown).

In order to further support the parallel reaches 16 and 18 of the endless carriers 10 and 12 opposed V-belts indicated diagrammatically at 42 can be utilized to assist in supporting and moving the parallel reaches 16 and 18 through the remainder of the apparatus, as for example more fully illustrated in above mentioned U.S. Patent No. 3,169,087.

As likewise illustrated in the aforesaid patent, a hoop-like wheel indicated as a whole by the numeral 46 rotatably surrounds the parallel reaches 16 and 18 of the endless carriers 10 and 12 and serves to deposit on the endless carriers flexible strands from spools carried on the wheel. More particularly, the wheel 46 is diagrammatically shown in FIGURE 4 as including a fixed internal support 48 having openings 50 through which the parallel reaches 16 and 18 of the endless carriers extend. The fixed internal support 48 carries a bearing 52 which rotatably mounts internally a hollow box-like structure 54 forming the wheel 46. The wheel 46 is provided with a rim gear 56 adapted to be engaged by a spur gear 58 driven through an adjustable speed gear changer 60 from the motor 20, this last being best seen in FIGURE 1.

A plurality of spools 62 are mounted around the sides of the wheel 46, each carrying a flexible reinforcing strand 64 which strands are fed through openings 66 in the wheel to a guide ring 68 having circumferentially spaced grommets 70 through which each strand 64 extends as it is wrapped helically about the parallel reaches 16 and 18 upon the rotation of the wheel 46.

Coming now to the mechanism for assisting in transporting each strand from the guide ring 68 to the endless reaches 16 and 18 of the carriers 10 and 12, reference should be had to FIGURE 2. This figure shows a rotary means, indicated as a whole by the numeral 72, for receiving each strand 64 from the guide ring 68 and for feeding and guiding each strand in turn onto the parallel reach 16 of the endless carrier 10. More specifically, the rotary means 72 comprises an endless belt 74 mounted between a pulley 76 and a pulley 78 and extending substantially at the angle illustrated. The pulley 76 is mounted on a driven shaft 80 for moving the belt 74 in the direction of the arrows. With the guide ring 68 moving in the direction of the arrow and the parallel reach 16 moving in the direction of its arrow the strands 64 are carried in turn into engagement with the parallel reach 16 to deposit the strands in turn in a uniformly spaced manner on the parallel reach 16, the top strand 64 being shown in actual engagement with the parallel reach 64, and with the remaining strands 64 shown in FIGURE 2 being brought in turn into engagement with the reach 16 as the various parts move in the direction of the arrows.

FIGURE 3 illustrates a modification of the apparatus of FIGURE 2 wherein the rotary means 72a takes the form of a cone 74a mounted upon a driven shaft 80a and serving to convey in guided manner the strands 64a in turn into engagement with the parallel reach 16a of the endless carrier 10a and conducting these strands from the guide ring 68a. The parallel reach 16a is held in proper position and is driven in the direction of the arrows by wheels 28a and 34a having grooves 32a and 36a therein.

To the person skilled in the art who has full knowledge of the aforementioned U.S. patent, and also other patents in the field, the operation of the apparatus as herein described will be evident. Suffice it to say here that by controlling the adjustable gear drives 22 and 60 the relative speed of rotation of the wheel 46 and the parallel reaches 16 and 18 of the endless carriers 10 and 12 can be adjusted so as to provide for any selected strand angle between, for example 20° and 50°, in the plastic web produced. Usually, the flexible strands are laid up to make either an angle of 45° or an angle of 30° with a line transverse of the web, and an angle of 30° is generally preferred.

It will be likewise understood by those skilled in the art that the apparatus of FIGURE 1 as illustrated and described does not show the complete apparatus for making the entire plastic web. Such complete apparatus normally includes means for applying a plastic either in sprayed on or sheet form to the flexible strands wound in flat helixes around the endless carriers, means, if desired, for applying flexible strands in a warp direction, means for drying or curing the assembly produced, means for cutting the edges of the web assembly from the parallel reaches of the endless carriers, and means for winding up the web assembly. Such additional means are not included in the present disclosure because they are not herein claimed as part of the combination.

While a certain representative embodiment and details have been shown for the purpose of illustrating the invention, it will be apparent to those skilled in this art that various changes and modifications may be made therein without departing from the spirit or scope of the invention.

What is claimed is:

1. In apparatus for making strand reinforced webs a pair of endless carriers having spaced parallel reaches, means for advancing the reaches, a hoop-like wheel surrounding the reaches, a plurality of strand-carrying spools on the wheel, a guide ring carried with and in inside concentric relation with the wheel, a plurality of circumferentially-spaced eyes on the guide ring each eye guiding a strand, adjustable speed means to rotate the wheel from its outer rim and in adjustable speed relation with the means for advancing the reaches to wrap the strands in a flat helix around the parallel reaches of the carriers as these are advanced, a rotary means positioned between the guide ring and each parallel reach of a carrier to guide each strand from its eye to said parallel reach for deposit thereon during the operation of the apparatus, and means for rotating said rotary means.

2. In apparatus for making strand reinforced webs a pair of endless carriers having spaced parallel reaches, means for advancing the reaches, a hoop-like wheel surrounding the reaches, a plurality of strand-carrying spools on the wheel, a guide ring carried with and in inside concentric relation with the wheel, a plurality of circumferentially-spaced eyes on the guide ring each eye guiding a strand, means to rotate the wheel to wrap the strands in a flat helix around the parallel reaches of the carriers as these are advanced, and a rotary means positioned between the guide ring and each parallel reach of a carrier to engage and guide each strand from its eye to said parallel reach for deposit thereon during the operation of the apparatus.

3. The combination defined in claim 2 wherein the rotary means is an endless belt inclined at an angle to a parallel reach and where the strands slide along the belt in moving from the eye to the reach having a straight longitudinal axis.

4. In apparatus for making strand reinforced webs a pair of endless carriers having spaced parallel reaches, means for advancing the reaches, a hoop-like wheel surrounding the reaches, a plurality of strand-carrying spools on the wheel, a guide ring carried with and in inside concentric relation with the wheel, a plurality of circumferentially-spaced eyes on the guide ring each eye guiding a strand, adjustable speed means to rotate the wheel from its outer rim and in adjustable speed relation with the means for advancing the reaches to wrap the strands in a flat helix around the parallel reaches of the carriers as these are advanced, and bearings internally and rotatably supporting the wheel.

5. In apparatus for making strand reinforced webs a pair of endless carriers having spaced parallel reaches, means for advancing the reaches, a hoop-like wheel surrounding the reaches, a plurality of strand-carrying spools on the wheel, a guide ring carried with and in inside concentric relation with the wheel, a plurality of circumferentially spaced eyes on the guide ring each eye guiding a strand, means to rotate the wheel to wrap the strands in a flat helix around the parallel reaches of the carriers as these are advanced, and a rotary means comprising a cone rotated about its axis is positioned between the guide ring and each parallel reach of a carrier to guide each strand from its eye and to deposit each strand on said parallel reach during the operation of the apparatus.

References Cited
UNITED STATES PATENTS

| | | | |
|---|---|---|---|
| 1,895,293 | 1/1933 | Morton | 66—85 |
| 2,954,816 | 10/1960 | Havemann | 156—427 X |
| 3,169,087 | 2/1965 | VanNess et al. | 156—431 |

EARL M. BERGERT, *Primary Examiner.*

J. P. MELOCHE, *Assistant Examiner.*